United States Patent
Selbie et al.

(10) Patent No.: US 7,769,142 B2
(45) Date of Patent: Aug. 3, 2010

(54) ASYNCHRONOUS DISCRETE MANAGEABLE INSTANT VOICE MESSAGES

(75) Inventors: John R. Selbie, Seattle, WA (US);
Stacia Scott, Redmond, WA (US); Leah Pearlman, Seattle, WA (US);
Raghuveer Simha, Seattle, WA (US);
Duoc Nguyen, Renton, WA (US);
Ahmed Azmy Hassan, Bellevue, WA (US); John S Holmes, Seattle, WA (US);
Alexandra Heron, Kirkland, WA (US);
Ram Aringunrum, Sammamish, WA (US); Eric Badger, Issaquah, WA (US);
Timothy Sharpe, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1252 days.

(21) Appl. No.: 11/275,368

(22) Filed: Dec. 28, 2005

(65) Prior Publication Data

US 2007/0036292 A1    Feb. 15, 2007

Related U.S. Application Data

(60) Provisional application No. 60/699,295, filed on Jul. 14, 2005.

(51) Int. Cl.
*H04M 1/64*    (2006.01)
(52) U.S. Cl. .................................. 379/68; 709/227
(58) Field of Classification Search .............. 379/67.1, 379/68, 88.01, 88.09, 88.11, 88.17, 88.13; 709/227, 238, 230
See application file for complete search history.

(56) References Cited

U.S. PATENT DOCUMENTS

| | | | |
|---|---|---|---|
| 4,646,346 A | 2/1987 | Emerson et al. | |
| 4,839,857 A * | 6/1989 | Mersiovsky et al. | 369/25.01 |
| 6,222,909 B1 * | 4/2001 | Qua et al. | 379/88.22 |
| 6,226,533 B1 * | 5/2001 | Akahane | 455/566 |
| 6,668,244 B1 * | 12/2003 | Rourke et al. | 704/275 |
| 6,757,531 B1 * | 6/2004 | Haaramo et al. | 455/414.1 |
| 6,876,729 B1 * | 4/2005 | Kuter et al. | 379/88.22 |
| 6,944,440 B1 * | 9/2005 | Kim | 455/412.1 |
| 6,990,180 B2 * | 1/2006 | Vuori | 379/88.25 |
| 7,082,469 B2 * | 7/2006 | Gold et al. | 709/231 |
| 7,366,779 B1 * | 4/2008 | Crawford | 709/227 |
| 7,395,078 B2 * | 7/2008 | Roth | 455/466 |
| 7,496,353 B2 * | 2/2009 | Odinak | 455/413 |
| 2004/0248594 A1 | 12/2004 | Wren, III | |
| 2005/0135333 A1 * | 6/2005 | Rojas | 370/352 |
| 2006/0168012 A1 * | 7/2006 | Rose et al. | 709/206 |
| 2006/0256810 A1 * | 11/2006 | Yarlagadda et al. | 370/465 |
| 2007/0112925 A1 * | 5/2007 | Malik | 709/206 |
| 2007/0116192 A1 * | 5/2007 | Cutshall et al. | 379/67.1 |
| 2009/0222450 A1 * | 9/2009 | Zigelman | 707/10 |

* cited by examiner

*Primary Examiner*—Olisa Anwah
(74) *Attorney, Agent, or Firm*—Lee & Hayes, PLLC

(57) ABSTRACT

Asynchronous voice messaging is employed to enable individuals to send voice clips back and forth over a network. In at least some embodiments, the voice clips reside in the form of discrete, manageable objects that can be easily managed by the user. In addition, some embodiments described provide hand-free/eyes-free functionality that can permit a user to create and send (or receive and play) a voice message without having to physically enter an intended recipient's address or otherwise digitally manipulate the device over which the message is sent or received.

19 Claims, 10 Drawing Sheets

ASYNCHRONOUS DISCRETE MANAGEABLE INSTANT VOICE MESSAGES

RELATED APPLICATION

This application claims priority to U.S. Provisional Application Ser. No. 60/699,295, filed on Jul. 14, 2005, the disclosure of which is incorporated by reference herein.

BACKGROUND

Voice messages, in which an individual creates and provides a verbal message for another, are an effective way to personalize communication between two or more people. Challenges continue to be posed for those in the industry to develop more effective, efficient and user-friendly ways of voice messaging.

SUMMARY

Asynchronous voice messaging is employed to enable individuals to send voice clips back and forth over a network. In at least some embodiments, the voice clips reside in the form of discrete objects that can be easily managed by the user.

In addition, some embodiments provide hand-free/eyes-free functionality that can permit a user to create and send (or receive and play) a voice message without having to physically enter an intended recipient's address or otherwise digitally manipulate the device over which the message is sent or received.

DETAILED DESCRIPTION

Overview

In various embodiments described below, asynchronous voice messaging is employed to enable individuals to send voice clips back and forth over a network. In at least some embodiments, the voice clips reside in the form of discrete, manageable objects that can be easily managed by the user. For example, voice clip objects can be cached, stored, copied, sent, received, played, stopped, forwarded, replayed or otherwise manipulated in a manner that leverages file system utilities and provides the sender and/or recipient with a highly desirable level of convenience.

In addition, some embodiments described below provide hand-free/eyes-free functionality that can permit a user to create and send (or receive and play) a voice message without having to physically enter an intended recipient's address or otherwise digitally manipulate the device over which the message is sent or received.

The discussion below proceeds in accordance with the following sections. First, a section entitled "Asynchronous Voice Messaging" is provided and introduces the notion of asynchronous voice messaging in the context of creating and sending instant voice messages. Following this, a section entitled "Creating and Managing a Voice Clip Object" is provided and describes but one exemplary way of creating and managing an exemplary voice clip object. Next, a section entitled "Implementation Example" is provided and describes but one exemplary implementation that can embody the inventive principles described in the preceding sections. In this section, an exemplary user interface is illustrated and described to provide the reader with some additional context with regard to the user experience. This section also provides a description of various features that can be implemented with the exemplary voice clip object in accordance with various embodiments. Following this, a section entitled "Hand-Free/Eyes Free Voice Messaging" describes an implementation in which a user can create, send, receive and play voice messages without having to digitally engage the device over which the message is sent or received.

Asynchronous Voice Messaging

In the discussion that follows, the notion of asynchronous voice messaging and, more particularly, asynchronous instant voice messaging is introduced. In asynchronous voice messaging, a persistent connection between senders and recipients is not required, although such can be used. By not requiring a persistent connection, individuals can communicate with one another, even though one of the parties may be offline, busy or unobtainable.

In the embodiments described below, a voice clip object is utilized to enable individuals to asynchronously communicate with one another.

Creating and Managing a Voice Clip Object

Figure 1:
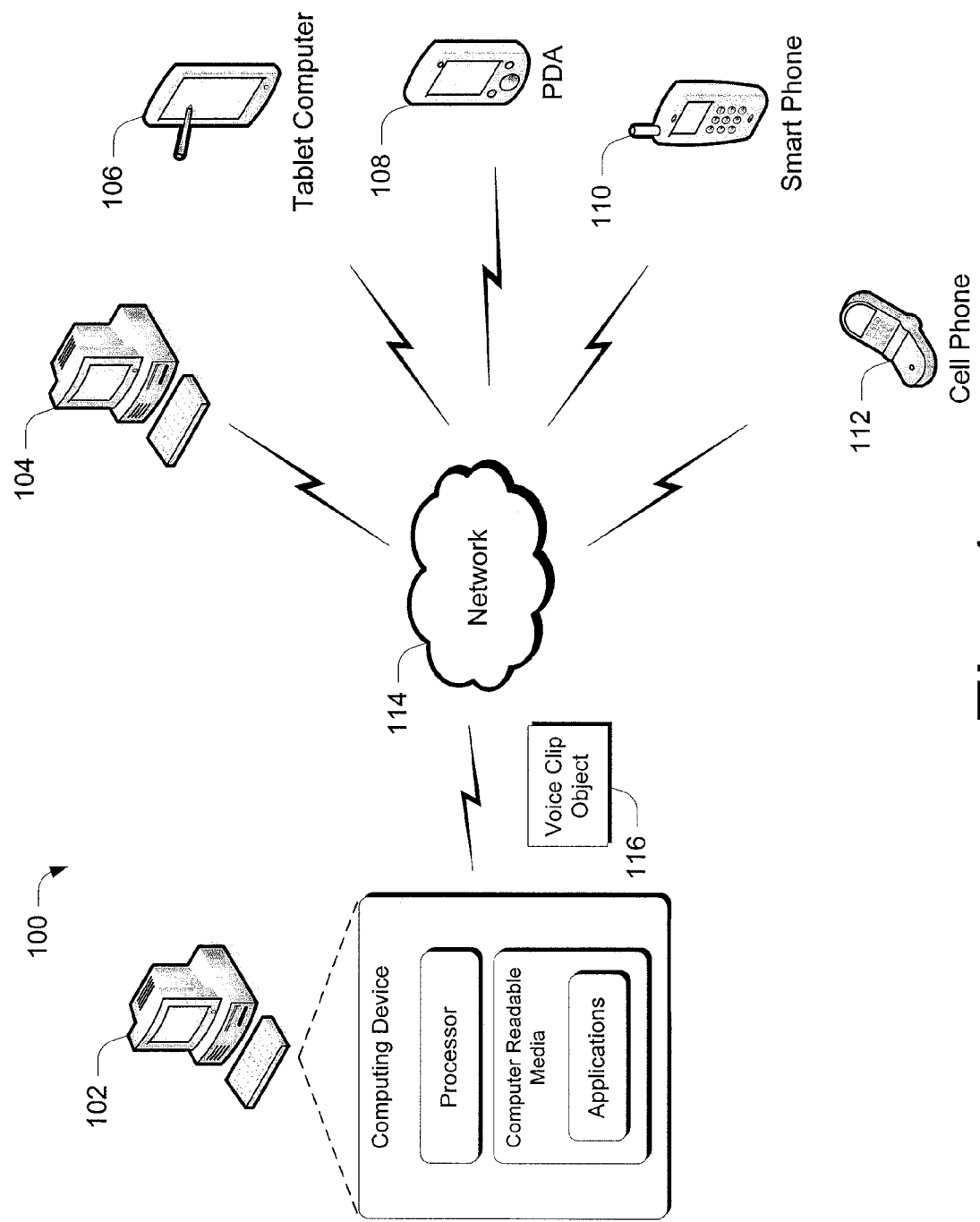
FIG. 1 illustrates an exemplary system that can employ the principles described herein, in accordance with one embodiment.

FIG. 1 illustrates an exemplary system, generally at 100, in which the asynchronous instant voice message techniques described in this document can be implemented in accordance with one embodiment. System 100 includes, in this particular example, a computing device 102 that includes one or more processors, one or more computer-readable media and one or more applications embodied on the computer-readable media. For the sake of brevity, other known components of computing device 102 are not illustrated.

System 100 also includes other computing devices which, by way of example and not limitation, can include a computing device 104, a tablet computer 106, a personal digital assistant (PDA) 108, a smart phone 110 and a cell phone 112. Some of these devices can be considered as mobile devices, e.g. devices 106, 108, 110 and 112, while others are not considered as mobile devices, e.g. devices 102, 104. The computing devices of this example communicate with one another by means of a network, such as network 114. Any suitable network can be utilized, with the Internet serving as but one example of a network.

In the illustrated and described example, one or more applications that execute on computing device 102 permit a user to create and manage a discrete voice clip object, such as voice clip object 116. Typically, though not always as will become apparent below, the application presents a user interface to the user and permits the user to create and manage the voice clip objects. But one example of such a user interface is provided below in the section entitled "Implementation Example".

Once the user creates a voice clip object on their computing device, the voice clip object can be asynchronously sent to one or more intended recipients, such as the users of computing devices 104-112. If an intended recipient is unavailable, the voice clip object can be saved or cached, either locally or on a suitable server, and provided to the user when the user is again available. In practice, any suitable application can be utilized to enable a user to create and manage voice clip objects, such as the one described above. In but one embodiment, an application in the form of an instant messaging application, such as Microsoft's Windows® Live Messenger, can be utilized and can leverage infrastructure that is already in place to support the instant voice messaging functionality, as will be appreciated by the skilled artisan. Of course, other instant messaging applications or applications in general can be utilized without departing from the spirit and scope of the claimed subject matter.

Figure 2:
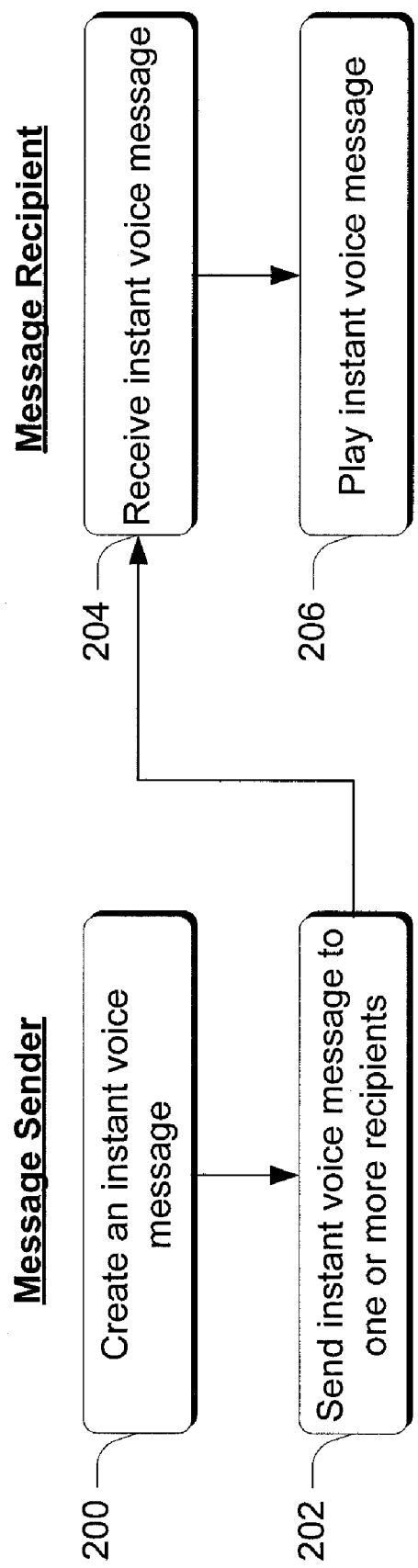
FIG. 2 is a flow diagram that describes steps in a method in accordance with one embodiment.

FIG. 2 is a flow diagram that describes steps in a method in accordance with one embodiment. The method can be implemented in connection with any suitable hardware, software, firmware or combination thereof. In but one embodiment, the method can be implemented by a software application, such as an instant messaging application. The steps of the illustrated method are separated into those that are performed by a message sender (or the sender's computing device) and those that are performed by the message recipient (or the recipient's computing device).

Step 200 creates an instant voice message. This step can be performed in any suitable way. For example, in at least some embodiments, the instant voice message can be created by presenting, via an application, a suitable user interface that enables the user to select one or more recipients and record his/her message. Alternately or additionally, this step can be performed in a hands-free/eyes-free manner, an example of which is provided below. In this particular example, when an instant voice message is created, a corresponding discrete manageable voice clip object is created.

Step 202 sends the instant voice message to one or more recipients. As indicated above, this step can be accomplished in an asynchronous manner by delivering the corresponding voice clip object over a network, such as network 114 (FIG. 1) to the intended recipient(s). Any suitable method of delivery, including any suitable transport can be utilized. In one embodiment, the method and transport that is utilized to deliver the voice clip object is one that is employed by an instant messaging application.

Step 204 receives the instant voice message and step 206 plays the instant voice message. Step 206 can be performed either contemporaneously with receiving the message (such as automatically upon receiving the message), or at a later time. For example, if the intended recipient is unavailable, the corresponding voice clip object can be cached and maintained until the intended recipient is able to receive and listen to the voice message.

Implementation Example

As noted above, any suitable application can be utilized to asynchronously send and receive instant voice messages. In but one embodiment, such application can reside in the form of an instant messaging application. As an example, consider FIG. 3, which illustrates exemplary user interfaces, generally at 300, that can be presented by an instant messaging application.

Here, there are two conversation windows 302, 304, respectively, opened between a message sender and a message recipient. In this example, there are two connections that are utilized between the sender and the recipient—a first connection referred to as an instant messaging connection and a second connection referred to as a peer-to-peer connection.

The instant messaging connection is a relatively lightweight connection that enables text messages to be sent back and forth, as will be appreciated by the skilled artisan. The peer-to-peer connection is a generally more robust direct connection between individuals that allows higher bandwidth activities to take place, such as file transfers and voice clip object exchanges. This connection can be transport independent. For example, the connection can be supported by a server such as Microsoft's Messenger Switchboard, or be supported through UDP, TCP/IP, email and the like.

Notice in conversation window 302 that a voice clip button 306 is provided. A similar button is provided in conversation window 304, but it is not specifically designated. Now, assume that the two users in the FIG. 3 example have an open text session that utilizes the instant messaging connection to send text back and forth between them. Assume now that the user of conversation window 302 wishes to send a voice clip to the user of conversation window 304. To do so, the user simply clicks and holds button 306 and can begin recording his or her message via a microphone (not shown) that is connected with or built into his/her computing device.

Figure 3:
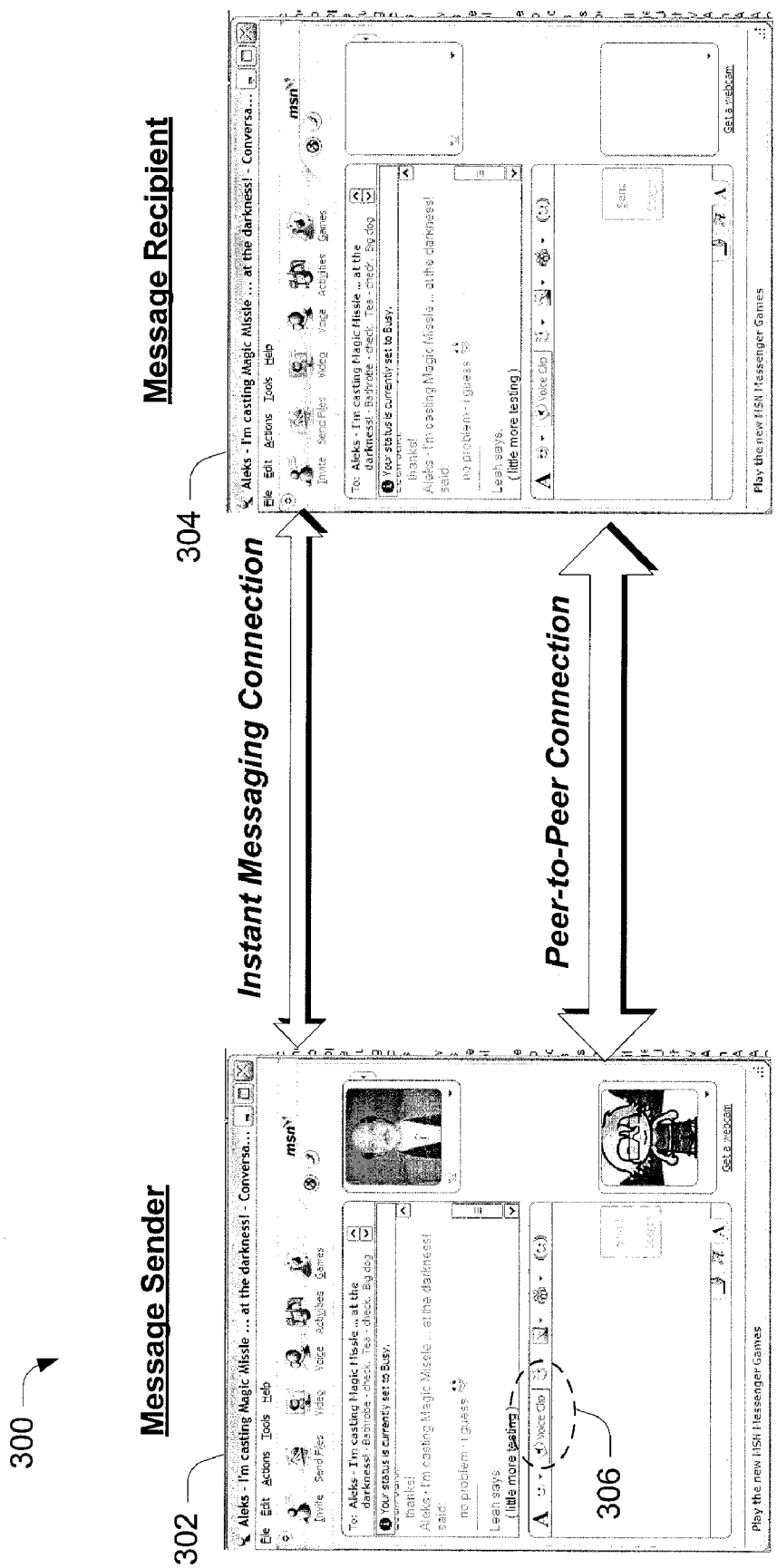
FIG. 3 illustrates an exemplary user interface in accordance with one embodiment.
Figure 4:
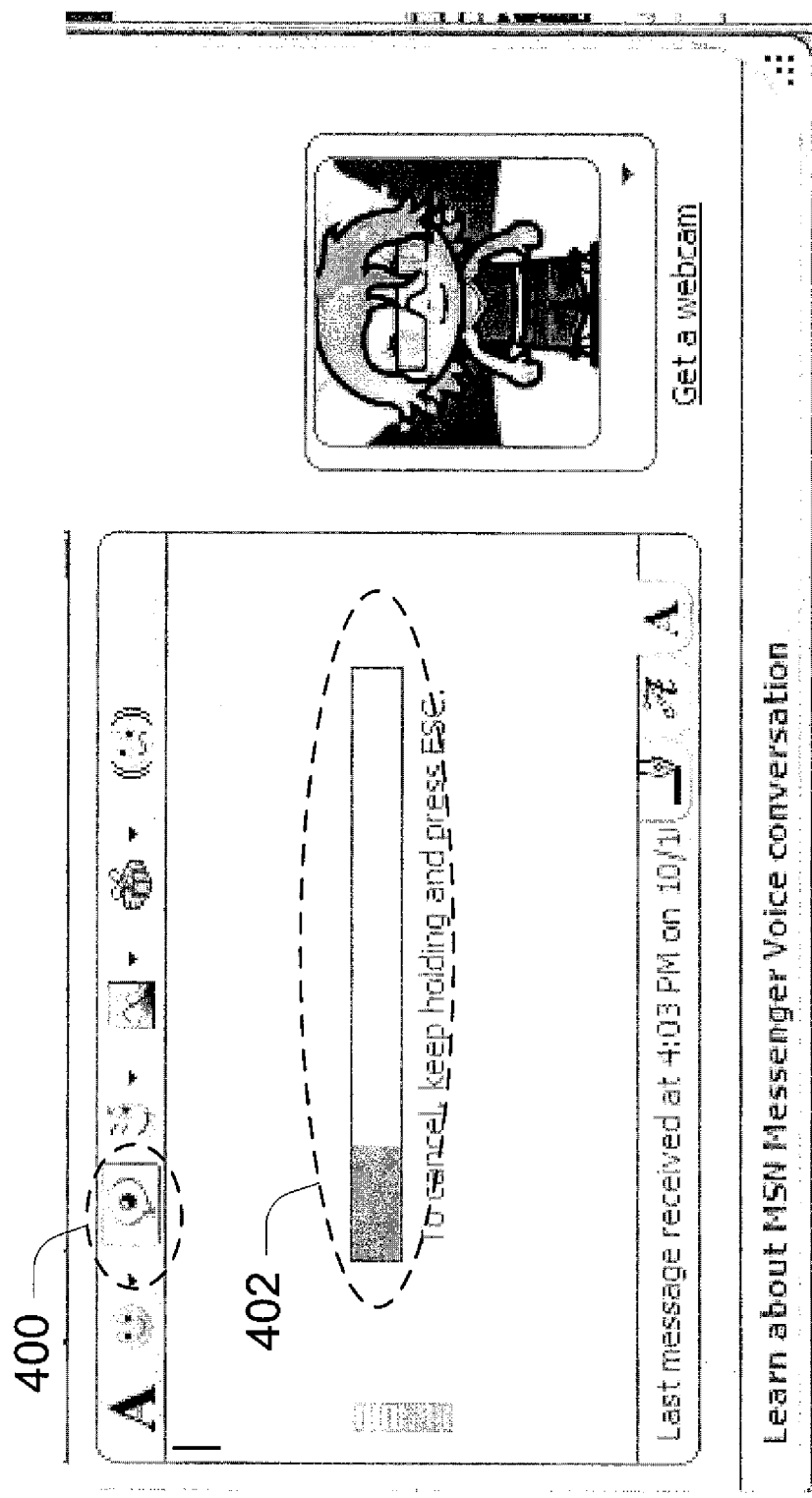
FIG. 4 illustrates an exemplary user interface in accordance with one embodiment.

FIG. 4 illustrates a portion of the FIG. 3 conversation window during the time that the user is recording his or her message. Notice that an icon 400 indicates that recording is taking place, and user interface component 402 indicates how much time is left to record the message.

Once the message is recorded, the corresponding sound file (e.g. a .wav file) is compressed to provide a voice clip object and placed in an object store. When the voice clip object is placed in the object store, it is provided with a unique object store name that uniquely identifies the voice clip object. In one embodiment, the object store name identifies the computer on which the voice clip object resides, the size of the file, and contains metadata that identifies the location of the voice clip object on the computer.

Now, using the instant messaging connection (FIG. 3), an instant message having a particular type is sent to the intended recipient(s) of the voice clip object. The particular type of message is one that indicates that it is not a normal text message with text that is to be displayed for the recipient. Rather, the message type indicates that the message contains data that is to be used in connection with voice clip activities. The data that this message contains, in one embodiment, is the object store name that corresponds to the voice clip object that resides on the message sender's computer.

By virtue of the message type (i.e. DATA type), the recipient's messaging application knows that the message is not a text message to be displayed for the user, but rather is a data message that contains data associated with a voice clip object. Now, by virtue of having the voice clip's object store name, the intended recipient's application can take steps to acquire the voice clip object from the sender's computer.

More specifically, if a peer-to-peer connection between computing devices is not currently in force, the connection can now be established between the computing devices in the usual way using, for example, each device's IP address. Once the peer-to-peer connection is established, then, in this embodiment, the intended recipient's application can send a request to the message sender's application that includes the voice clip object's object store name. When the sender's application receives this request, it processes the object store name, ascertains whether it has a corresponding voice clip object in its object store and if so, transmits the voice clip object to the recipient via the peer-to-peer connection.

The recipient's application can now take steps to enable its user to listen to the voice clip object. Specifically, in this example, the application caches the voice clip object and provides user interface instrumentalities to enable the user to listen to the clip or otherwise manage the clip.

Figure 5:
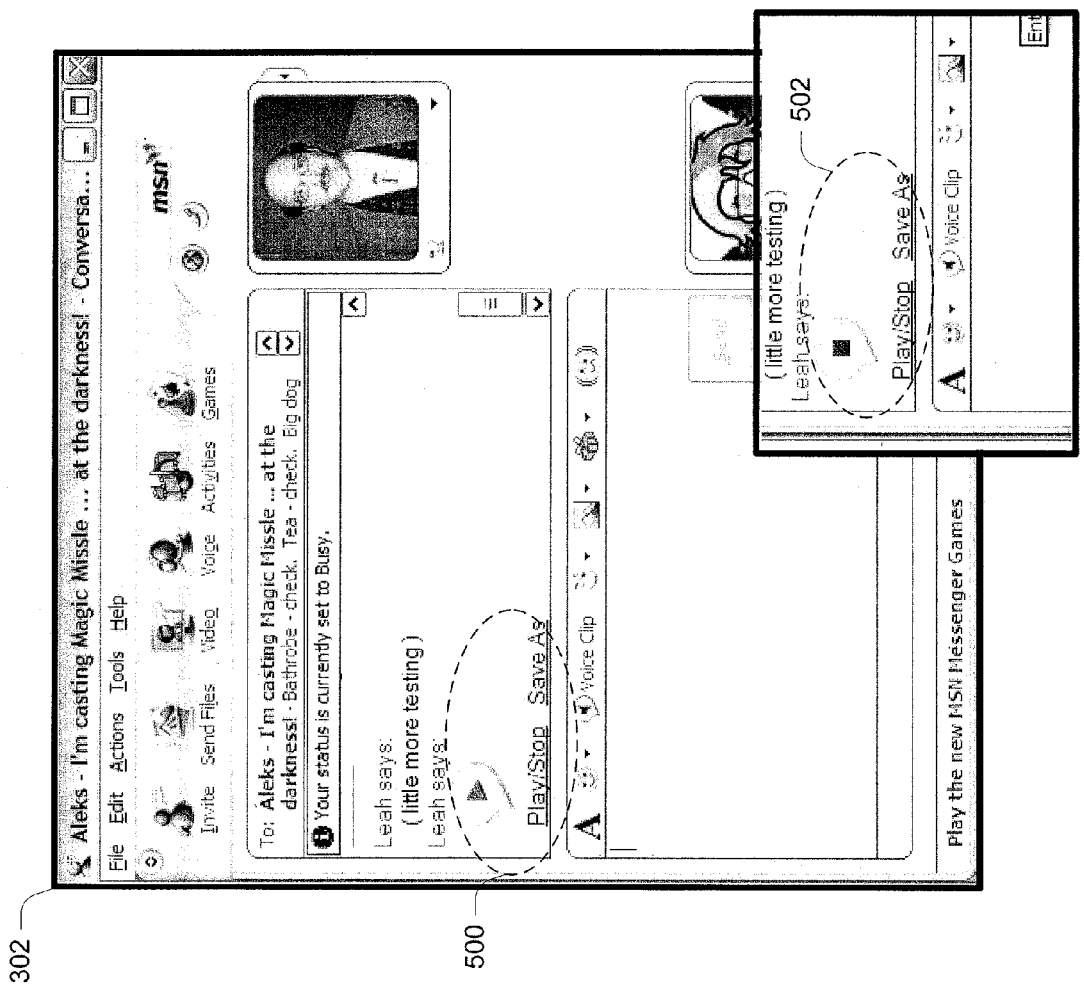
FIG. 5 illustrates an exemplary user interface in accordance with one embodiment.

As an example, consider FIG. 5 which illustrates conversation window 302 from FIG. 3. In this example, when the voice clip object is received it can be automatically played for the recipient. In the event the recipient wishes to replay the voice clip object or stop the voice clip object, buttons 500, 502 respectively can be used. In addition, notice that a "Save As" link is provided and enables the recipient to manage the voice clip object by being able to save the voice clip object to a desired location on their computing device. The recipient can also save his/her voice clip object by right-clicking a mouse button in the usual way.

Consider now some additional features in accordance with one embodiment. Each additional feature is discussed under its own heading below.

Multi-Tasking/Multi-Party Communication

In one embodiment, users can multi-task and/or take part in multi-party communication. As an example, a user can open up multiple different conversation windows with multiple other users and, by simply moving between conversation windows, the user can send different voice clip objects to multiple different users.

Figure 6:
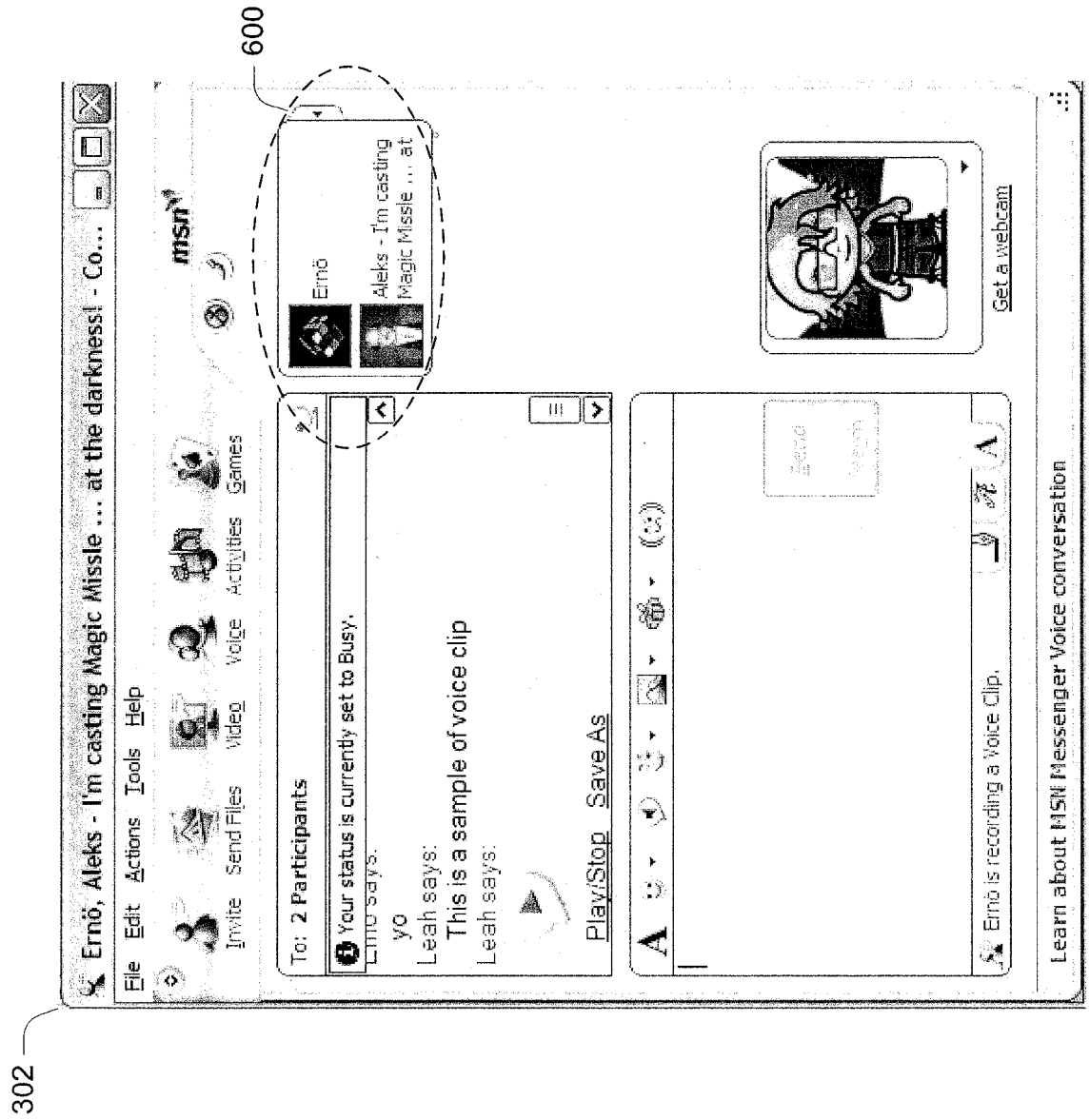
FIG. 6 illustrates an exemplary user interface in accordance with one embodiment.

Alternately or additionally, users can take part in multi-party communication in which the same voice clip object is sent to multiple different users. As an example, consider FIG. 6 which illustrates conversation window 302. Notice that a group of intended recipients is identified at 600. When a user records a voice clip, the corresponding voice clip object can be sent to a number of different intended recipients.

Saving and Managing Voice Clip Objects

In at least some embodiments, in the same way that a user can save the text of a text instant message, users can now save some or all of a voice conversation by saving the individual voice clip objects. One example of how this can be done is via a "Save As" link described above. In addition, various instrumentalities can be provided to help a user manage their voice clip objects. For example, drag and drop functionality can be provided to give users an easy and quick way to save or move voice clip objects around their computing device or between or within applications. In these embodiments, all clips can be saved by default with the contact's name and a time stamp so that users can keep track of when and from where the voice clip object came. In addition, in at least some embodiments, the voice clip objects can leverage the file transfer system to thus allow users to drag/drop or save/send voice clips to other conversation windows in the same way they can cut and paste text from text instant messaging conversation windows.

Exercise Caution

Unlike a synchronous audio scenario, in at least some embodiments, a user can decide part way through recording a message that he or she does not want the user on the other end to hear what s/he is saying. In this instance, a cancellation option is provided in the form of a selectable key (esc) can give the user the option to cancel the recording of the voice clip.

Sound Detection

In addition, in at least some embodiments, the application that exposes the voice clip functionality has the ability to detect if no sound is being recorded and notify the user accordingly. This can avoid sending a blank voice clip object in the event the user's microphone is muted, off or unplugged, or in the event the user simply did not speak loudly enough to effect a meaningful recording.

Figure 7:
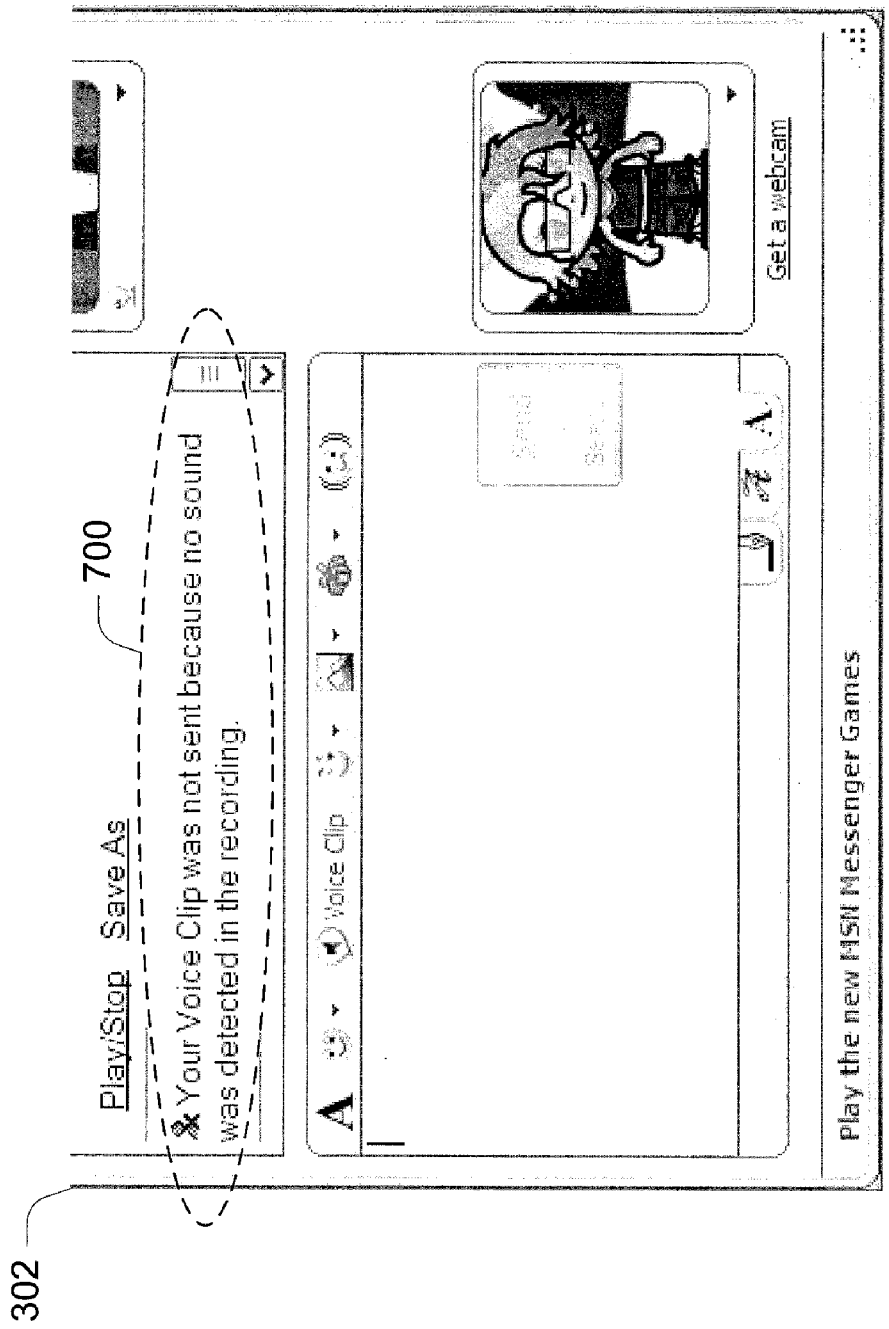
FIG. 7 illustrates an exemplary user interface in accordance with one embodiment.

As an example, consider FIG. 7 which illustrates a portion of conversation window 302. There, a user notification 700 is provided and informs that user that their particular voice clip was not sent because no sound was recorded. This can allow the message sender to fix the problem rather than sending blank sound clip objects to other users.

Controlling the Listening Environment

In various embodiments, users have the ability to control their listening environment. For example, users can receive voice clips and listen to them, not listen them, or re-listen to them at their leisure. This functionality is facilitated, at least in part in some embodiments, by the fact that the voice clips are wrapped up as individual packets or objects, thus allowing the objects to be more easily handled than an entire voice conversation.

In addition, in at least some embodiments, a user can pause the listening experience (i.e. the whole conversation) by simply minimizing the conversation window. When the user is ready to resume their listening experience, they can simply give the conversation window focus again. In this manner, the user never has to communicate to their contact that they have stopped listening and are temporarily focused on other activities. When the user brings the conversation window to the focus, they can hear everything they missed. This improves upon other approaches where, for example, a user who stops listening for a moment will miss what was said with no way to get it back without asking his or her contact to repeat the message.

Codec Capability and Negotiation

When voice clips are recorded, the clips are recorded as .wav files and then compressed using a codec. In some embodiments, the type of device that the intended recipient is on can drive the decision of which type of codec to use for compression. Typically, a message sender will know the type of computing device that the intended recipient is on because this information comprises part of the recipient's presence, as will be appreciated by the skilled artisan. If, as part of an intended recipient's presence, the message sender ascertains that the recipient is on a mobile device, then a lower bit rate codec can be used for compression. When the compressed voice clip object is sent to the recipient, an indication of the codec used for compression can be sent to the application as well, to enable the recipient's software to uncompress the voice clip object and play it.

Figure 8:
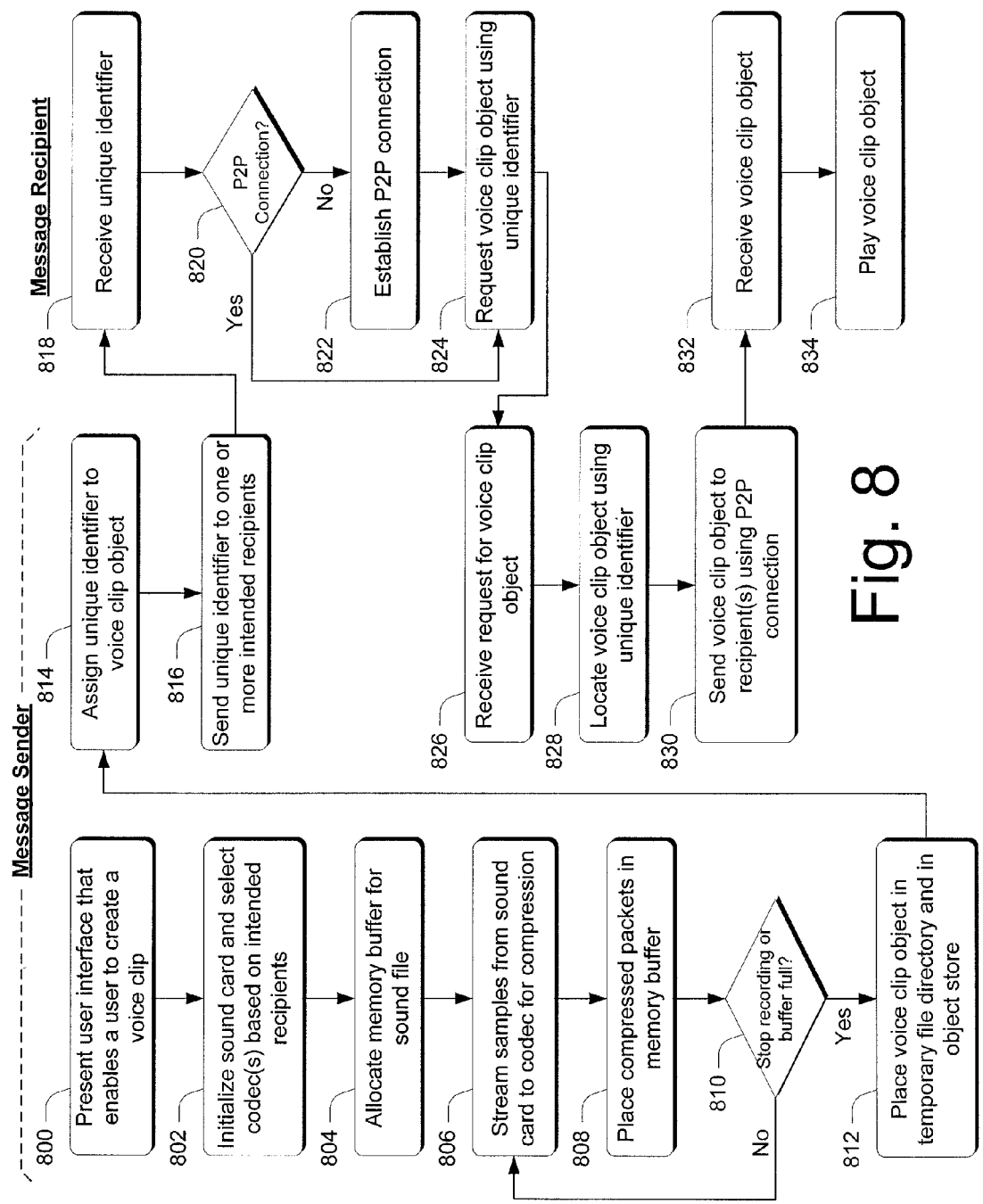
FIG. 8 is a flow diagram that describes steps in a method in accordance with one embodiment.

FIG. 8 is a flow diagram that describes steps in a method in accordance with one embodiment. The method can be implemented in connection with any suitable hardware, software, firmware or combination thereof. In but one embodiment, the method can be implemented by a software application, such as an instant messaging application. The steps of the illustrated method are separated into those that are performed by a message sender (or the sender's computing device) and those that are performed by the message recipient (or the recipient's computing device).

Step 800 presents a user interface that enables a user to create a voice clip. Any suitable user interface can be used, examples of which are provided above. Responsive to a user providing an indication that s/he wish to record a voice clip, step 802 initializes the computing device's sound card and selects one or more codecs based on the intended recipients. Step 804 allocates a memory buffer for the sound file that is to be created.

As the user records his or her voice clip, step 806 streams samples from the sound card to the codec(s) for compression. Step 808 places compressed packets in the memory buffer and step 810 ascertains whether the user has stopped recording or the buffer has become full. If the user has stopped recording or the buffer has become full, step 812 places a corresponding voice clip object in a temporary file directory and in an object store. The voice clip object in this example includes one or more compressed packets that make up the .wav file.

Step 814 assigns a unique identifier to the voice clip object, an example of which is given above. Step 816 then sends the unique identifier to one or more intended recipients. In at least some embodiments, this step is accomplished using a relatively lightweight instant messaging connection as discussed above.

Step 818 receives the unique identifier and step 820 ascertains whether a peer-to-peer connection exists between the recipient and the message sender. If there is no such connection, then step 822 establishes a connection in the typical way and step 824 requests the voice clip object using the unique identifier that was previously received. If, at step 820, a peer-to-peer connection already exists between the recipient and the sender, then the method branches to step 824.

Step 826 receives the request for the voice clip object and step 828 locates the voice clip object using the unique identifier. Once the voice clip object is located, step 830 sends the voice clip object to the intended recipient(s) using the peer-to-peer connection.

Step 832 receives the voice clip object and step 834 plays the voice clip object. To accomplish these steps, the recipient's computing device can place the voice clip object in a temporary cache, uncompress the object using the same codec that was used to compress it, and take steps to play it for the recipient. For example, if a conversation window is currently opened on the recipient's device, an icon that represents the voice clip can be presented to the recipient. Alternately or additionally, if the recipient has the conversation window set to automatic mode, then the voice clip can be played automatically.

Hand-Free/Eyes Free Voice Messaging

Communicating asynchronously on a mobile device, such as a cell phone or PDA, currently employs email, SMS, MMS, or some type of an instant messenger program. All of these communication approaches typically utilize text-based input. Mobile devices generally have very limited keyboard interfaces which can make the act of communicating asynchronously using these methods tedious, and in some situations, dangerous. For example, users are not able to communicate safely using text input while driving their cars.

In the embodiment described below, users can communicate asynchronously with one another using only their voice or speech commands as the input mechanism by which a voice clip is initiated, addressed, and sent. In some embodiments, this approach can be utilized with any of a user's contacts in, for example, their mobile device's address book. Accordingly, this can allow the user to speak the name of the contact to which they wish to send a voice message, record a message, and then send the message to the recipient—all through the use of voice commands. Hence, this can allow users to communicate without having to look at the particular device.

Exemplary System

Figure 9:
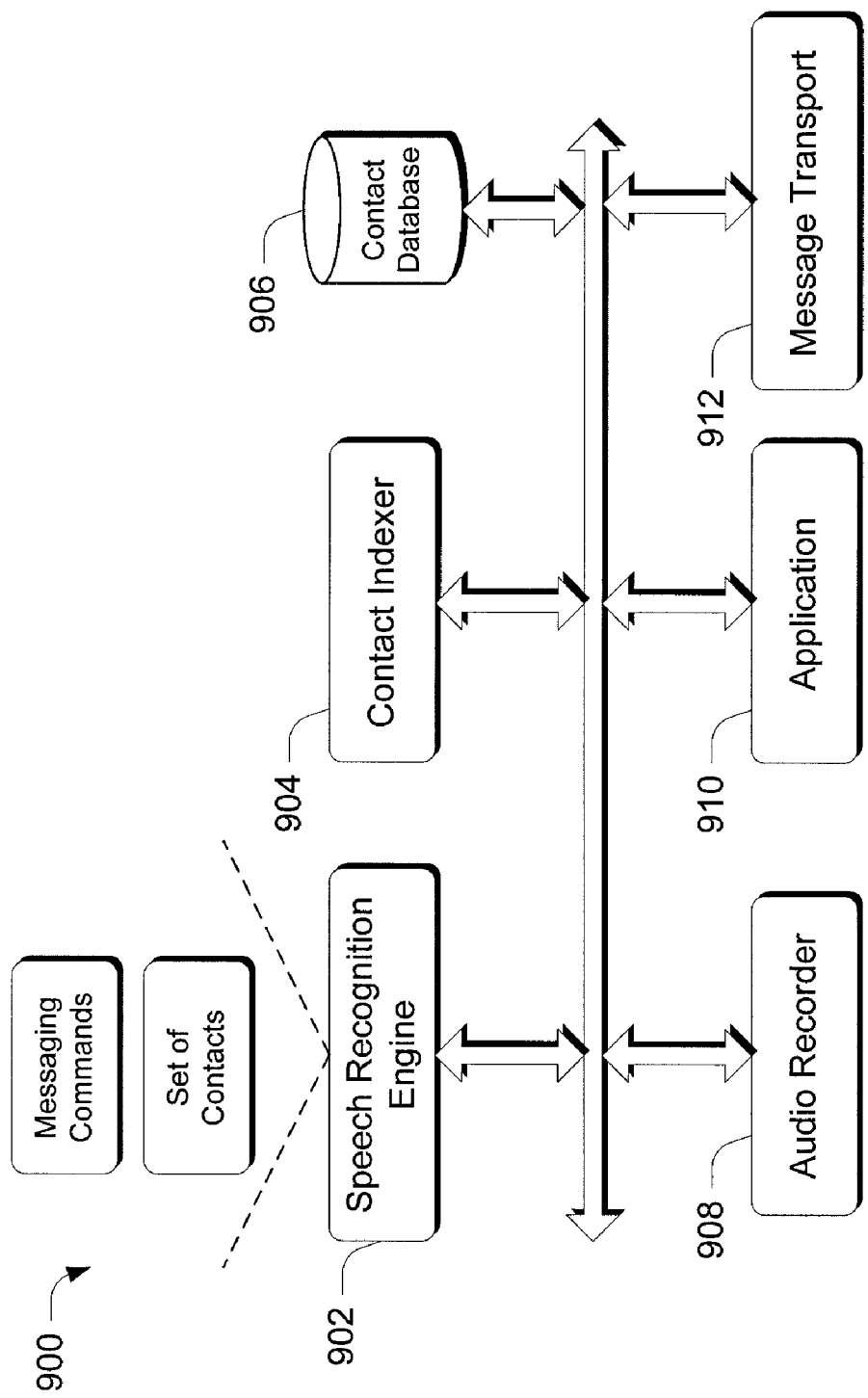
FIG. 9 illustrates a system in accordance with one embodiment.

FIG. 9 illustrates an exemplary system in accordance with one embodiment generally at 900. In this example, system 900 includes a speech recognition engine 902, a contact indexer 904, a contact database 906, an audio recorder 908, an application 910 and a message transport component 912. The companies Voice Signal and Fonix both have speech recognition suites for mobile devices that utilize a proprietary speech recognition engine that might be employed. In addition, Scansoft and Fonix both have commercially available engines and developer SDKs.

In accordance with one embodiment, speech recognition engine 902 includes a speaker-independent speech recognition engine that contains a context free grammar containing messaging commands and the set of user's contacts. Any suitable speech recognition engine can be utilized. When application 910 determines that the time is correct (such as when a user verbally or otherwise indicates that they wish to record a message), the speech recognition engine is provided with the audio data that is to be recognized—such as "Send message to Mike". When a recognition event occurs, application 910 can optionally ask the user to confirm the contact otherwise it will begin recording the audio message. The speech recognition engine 902 can also include a text-to-speech (TTS) engine that can be used to query the user for confirmation or for indicating the state of the system. Microsoft's Speech API 5.0 (SAPI 5.0) provides examples of an exemplary SAPI XML grammar which can be compiled into a context free grammar.

The contact indexer 904 is responsible for indexing all of the contacts in the user's contact database and building a context free grammar that is used by speech recognition engine 902 that will be used for speech recognition later. In at least some embodiments, the indexer keeps up with changes in the user's contact database and adjusts the contact grammar according to new contacts, deleted contacts or renamed contacts. When building the grammar, the indexer can include variations of the user's name as defined in the contact database. The indexer can include the first and last name, or first middle last, nickname, or company name.

Contact database 906 maintains a list of contacts to which voice messages can be sent. In some embodiments, this database or list can be maintained locally on a user's device, such as on their mobile computing device. Alternately or additionally, the contact database can be maintained remotely on another computing device, such as on a server, from which the contacts can be accessed. Such a database might include a large global list of contacts that can be accessed by many users.

Audio recorder 908 is responsible for querying the operating system for audio data from a physical microphone. Recording sources can be the microphone on the device, a wired headset, or a wireless headset. Recorder 908 can optionally compress the audio data for optimal transmission time and cost. The recorder component serializes the audio data to disk for later transmission or can stream the audio in real time to a remote source.

Application 910 includes all of the logic to tie the other components of the system together. Application 910 instructs contact indexer 904 to build the contact grammar. Application 910 also initializes the speech recognition engine 902 and other utilized operating system components. When a recognition event occurs in the speech recognition engine, application 910 decides whether or not to confirm the recognition result. Application 910 can then instruct the audio recorder 908 to begin and end recording the voice message. The application can then send the message to the appropriate recipient(s) via the specified protocol.

Message transport 912 implements or utilizes the actual transport mechanism responsible for physically transmitting the audio data to the receiving device. Examples of transports include, by way of example and not limitation, MMS message, Email Attachment via SMTP protocol, any proprietary TCP/IP protocol over a data network, or any real time out of band radio transmission over the cellular network.

In Operation

In operation, when a user wishes to send a voice message to a person in their contact list, they can either press a suitable button on their mobile computing device or state a suitable voice command. Responsive to the user indicating that they wish to send a voice message, application 910 loads the grammar that was created as described above, and activates the various rules for the voice message. Now, a user can speak a command and indicate an intended recipient, e.g. "voice message Lance". At this point, speech recognition engine 902 interacts with contact database to find the email address for "Lance". Once this recognition occurs, the system now understands the intent of the user (i.e. to send a voice message) and has the contact information.

Optionally, the text-to-speech component of the speech recognition engine can prompt the user to "Please speak your message". Responsively, an audio channel can now be opened and the audio recorder 908 can record the voice message and create a file or voice clip object. The user can have the option of deleting the message, adding to the message, adding additional recipients and the like.

If the user is satisfied with their message, then the user can send the message by speaking a command such as "Send Message". In one embodiment, when a voice clip is sent, it is sent as a .wav audio email attachment to the email address of the intended recipient. It is to be appreciated and understood that any other manner of transmitting the voice clip can be used such as instant messaging transports, voice clip transports (such as those described above) and the like.

When the message arrives in the recipient's email inbox, if it has an associated audio attachment, then the system running on the recipient's device can tell the user that an email has been received from the sender and that it has an audio attachment. The recipient's system can then prompt the recipient to ascertain whether they wish to listen to the audio attachment.

Figure 10:
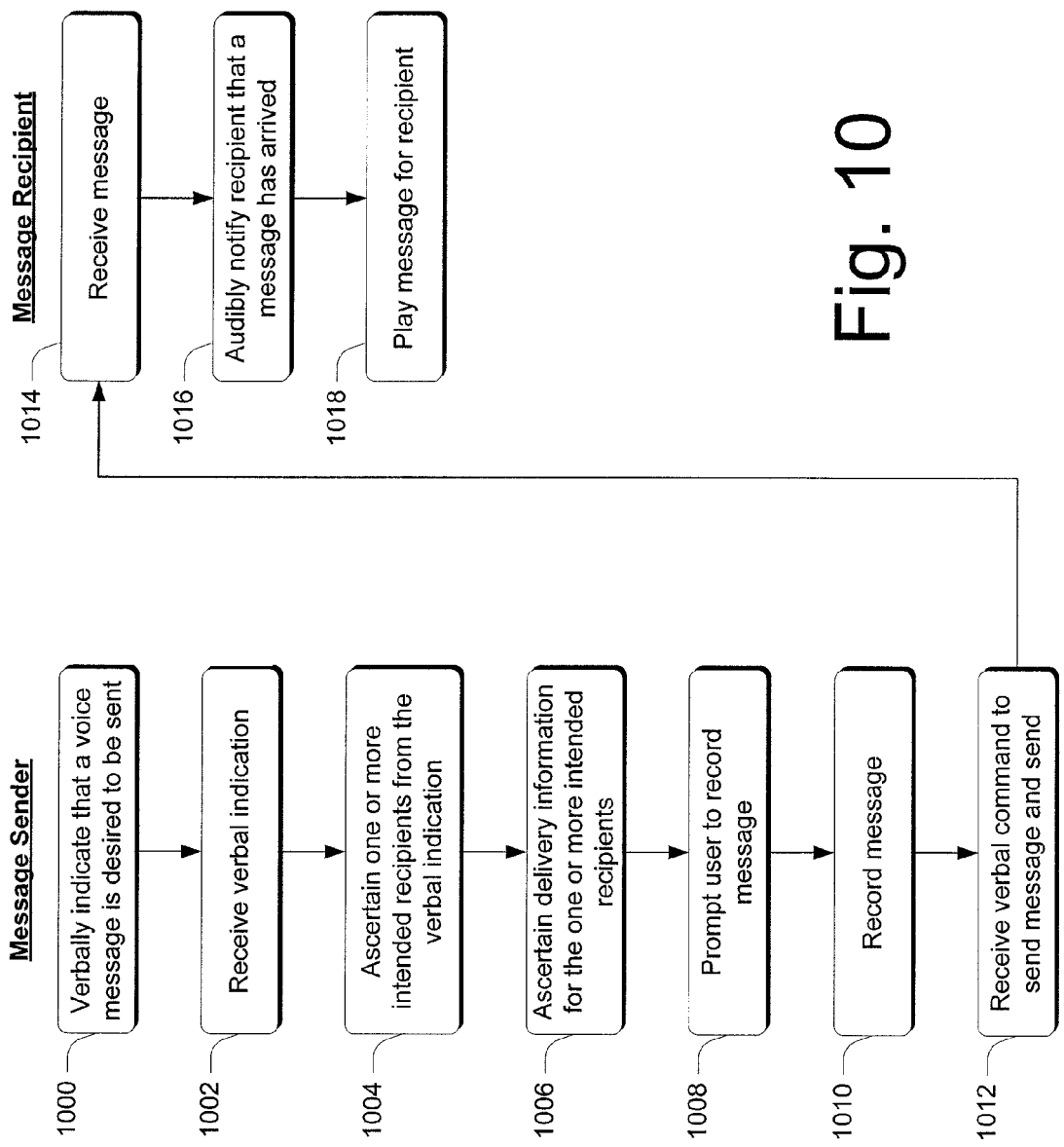
FIG. 10 is a flow diagram that describes steps in a method in accordance with one embodiment.

FIG. 10 is a flow diagram that describes steps in a method in accordance with one embodiment for asynchronously sending a voice message. The method can be implemented in connection with any suitable hardware, software, firmware or combination thereof. In but one embodiment, the method can be implemented in connection with a software application, such as application 910 in FIG. 9, embodied on a mobile computing device. The steps of the illustrated method are separated into those that are performed by a message sender (or the sender's computing device) and those that are performed by the message recipient (or the recipient's computing device).

Step 1000 verbally indicates that a voice message is desired to be sent. This step is typically performed by the user, an example of which is given above. Step 1002 receives the verbal indication and step 1004 ascertains one or more intended recipients from the verbal indication.

Step 1006 ascertains delivery information for the one or more intended recipients. This delivery information can comprise any suitable delivery information such as the recipient's email address, the IP address of the recipient's computer and the like.

Step 1008 prompts the user to record a message. In one embodiment, this prompt is an audio prompt. Step 1010 records the sender's message and step 1012 receives a verbal command to send the message and, accordingly, sends the message to the intended recipient(s).

Step 1014 receives the message and step 1016 audibly notifies the recipient that a message has arrived. Step 1018 then plays the message for the recipient. This step can be performed responsive to a verbal prompt by the recipient.

As will be appreciated by the description above, these steps can be accomplished in a hands-free, eyes-free manner.

CONCLUSION

Asynchronous voice messaging is employed to enable individuals to send voice clips back and forth over a network. In at least some embodiments, the voice clips reside in the form of discrete, objects that can be easily managed by the user. In addition, some embodiments described provide hand-free/eyes-free functionality that can permit a user to create and send (or receive and play) a voice message without having to physically enter an intended recipient's address or otherwise digitally manipulate the device over which the message is sent or received.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method, comprising:
presenting a user interface that permits a user to create a voice clip object;
assigning the voice clip object a unique identifier;
sending the unique identifier to an intended recipient of the voice clip object using an instant messaging connection with the intended recipient;
receiving, from the intended recipient, a request for the voice clip object that includes the unique identifier, the request received using a peer-to-peer connection; and
asynchronously sending the voice clip object to the intended recipient using the peer-to-peer connection.

2. The method of claim 1, wherein the presented user interface includes instrumentalities that permit the user to manage the voice clip object.

3. The method of claim 2, wherein at least some of the instrumentalities permit the user to listen to voice clip objects and save voice clip objects.

4. The method of claim 1, wherein the presenting is performed by an instant messaging application that can permit text messages to be created and sent to the recipients.

5. The method of claim 1, wherein the presented user interface includes instrumentalities that permit the user to receive and listen to voice clip objects received from others.

6. The method of claim 1, wherein the presenting comprises:
presenting an icon that indicates that recording is taking place, and
a user interface component that indicates how much time is left to record a voice clip.

7. The method of claim 1, wherein the presenting comprises presenting multiple conversation windows that permit the user to send different voice clip objects to different recipients.

8. The method of claim 1, wherein the presenting comprises presenting a conversation window that permit a user to send the same voice clip object to multiple recipients.

9. The method of claim 1, further comprising presenting in the user interface instrumentalities that permit the user to cancel recording of a voice clip object.

10. A computer-implemented method, comprising:
creating a voice clip object;
assigning the voice clip object a unique identifier;
sending the unique identifier to one or more intended recipients of the voice clip object using an instant messaging connection between the one or more intended recipients;
receiving, from the one or more of the intended recipients, the unique identifier;
sending the corresponding voice clip object to the one or more intended recipients from which the unique identifier was received using a peer-to-peer connection;
receiving from the one or more intended recipients a second voice clip object, the second voice clip object received using the peer-to-peer connection;
automatically playing the second voice clip object; and
pausing playing of the second voice clip object responsive to minimizing an instant messaging conversation window that includes a representation of the second voice clip object.

11. The method of claim 1, further comprising presenting, in the user interface, a conversation window that enables pausing a conversation by minimizing the conversation window.

12. The method of claim 10, further comprising receiving and listening to a voice clip object even though the user was not at an associated computer that received the voice clip object.

13. A computer-implemented method, comprising:
receiving a verbal indication that a voice message is desired to be sent to one or more intended recipients;
ascertaining one or more intended recipients of the voice message and delivery information associated with the one or more intended recipients;
recording the voice message;
receiving a verbal command to send the voice message to the one or more intended recipients;
assigning the voice message a unique identifier;
selecting a codec to compress the voice message based on a type of device the one or more intended recipients is using;
sending the unique identifier to the one or more intended recipients of the voice message using an instant messaging connection with the one or more intended recipients;
receiving, from the one or more intended recipients, a request for the voice clip object that includes the unique identifier, the request received using a peer-to-peer connection; and
sending the compressed voice message to the one or more intended recipients from which the unique identifier was received using the peer-to-peer connection.

14. The method of claim 13, further comprising receiving and playing a voice message in an eyes-free, hands-free manner.

15. The method of claim 13, wherein the delivery information comprises one or more recipient email addresses.

16. The method of claim 13 further comprising prior to the act of recording, audibly prompting a user to record the voice message.

17. The method of claim 13, wherein the acts of receiving a verbal indication, ascertaining, recording, receiving a verbal command, and sending are performed by a mobile device.

18. The method of claim 10, further comprising:
detecting if no sound is being recorded during a time when a user thinks that he or she is making a recording, and notifying the user that no sound was recorded.

19. The method of claim 1, further comprising selecting a codec to compress the voice clip object based on the type of device an intended recipient is using.

* * * * *